United States Patent [19]

Gerber et al.

[11] 4,327,615

[45] May 4, 1982

[54] METHOD AND APPARATUS FOR CUTTING SHEET MATERIAL WITH PREPROCESSED DATA

[75] Inventors: Heinz J. Gerber, Hartford; Charles M. Hevenor, Bolton, both of Conn.

[73] Assignee: Gerber Garment Technology, Inc., South Windsor, Conn.

[21] Appl. No.: 146,659

[22] Filed: May 5, 1980

[51] Int. Cl.³ .................. D06H 7/00; B26D 1/10
[52] U.S. Cl. .................................. 83/49; 83/56; 83/71; 83/520; 83/747; 83/753; 364/475
[58] Field of Search ............... 83/71, 74, 75, 925 CC, 83/49.56, 13, 753, 520, 747; 364/475

[56] References Cited

U.S. PATENT DOCUMENTS

| | | | |
|---|---|---|---|
| 3,803,960 | 4/1974 | Pearl et al. | 83/71 X |
| 3,855,887 | 12/1974 | Pearl et al. | 83/925 CC X |
| 3,864,997 | 2/1975 | Pearl et al. | 83/925 CC X |
| 3,887,903 | 6/1975 | Martell | 364/200 |
| 4,133,234 | 1/1979 | Gerber | 83/925 CC X |
| 4,133,235 | 1/1979 | Gerber | 83/925 CC X |
| 4,140,037 | 2/1979 | Gerber | 83/925 CC X |
| 4,178,820 | 12/1979 | Gerber | 83/925 CC X |

*Primary Examiner*—Frank T. Yost
*Attorney, Agent, or Firm*—McCormick, Paulding & Huber

[57] ABSTRACT

A method and apparatus for cutting multi-ply layups of limp sheet material employs an automatically controlled machine with a knife blade and a controller for guiding the blade along cutting paths defined by a marker of pattern pieces. The marker contains a plurality of pattern pieces in a closely packed array which causes the pattern pieces and segments of the cutting paths to be in contact or in close proximity to one another, and makes accurate cutting difficult or impossible. Digitized data defining a cutting program for the marker is preprocessed in a data processor to identify critical segments of cutting paths where cutting difficulties may arise and introduces into the data remedial command signals that guide the cutting blade past the identified critical segments for more accurate cutting.

26 Claims, 20 Drawing Figures

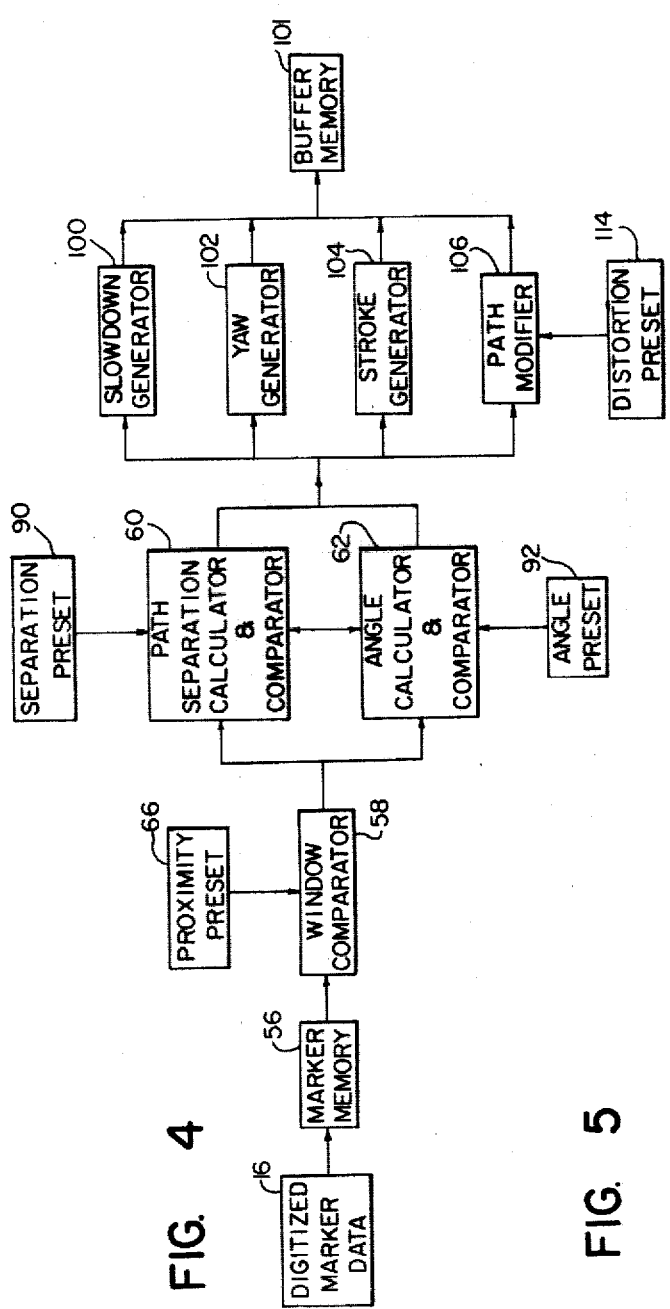
FIG. 4
FIG. 5
FIG. 6
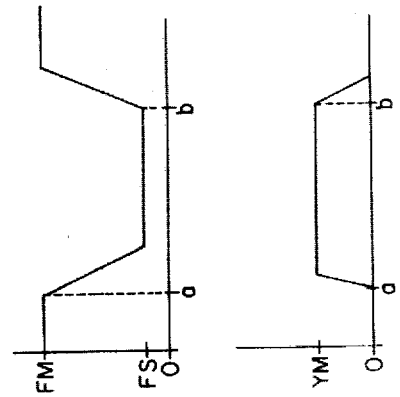

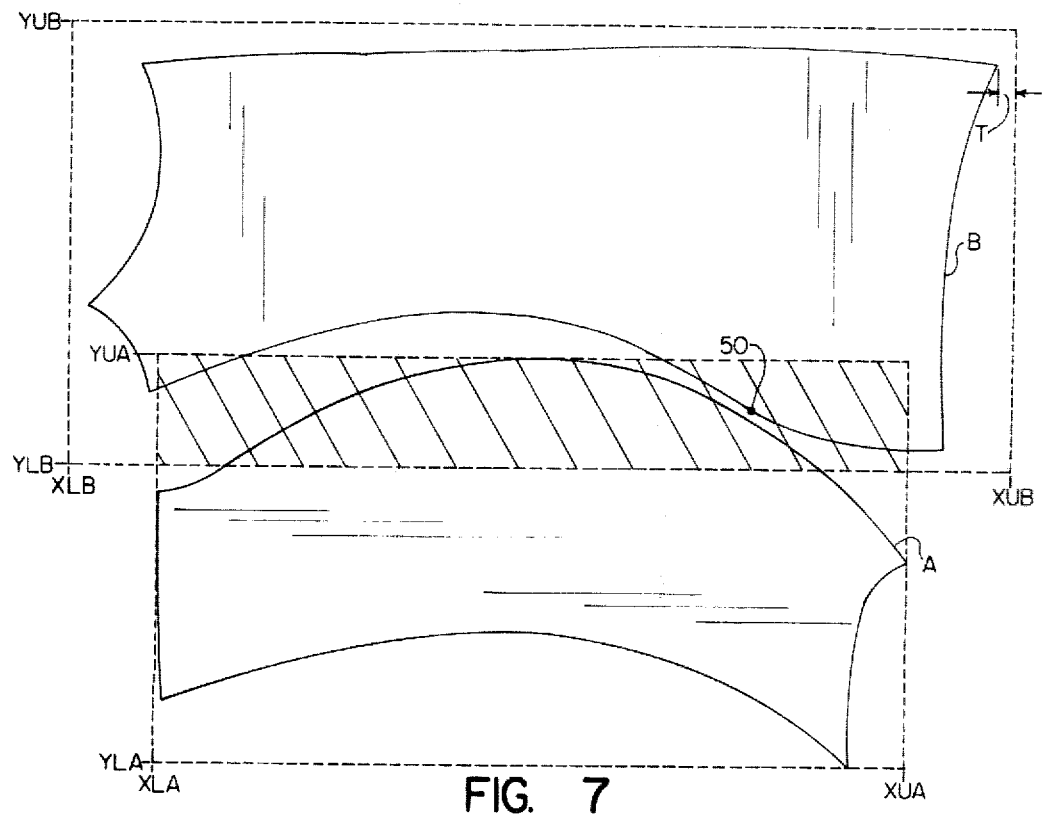
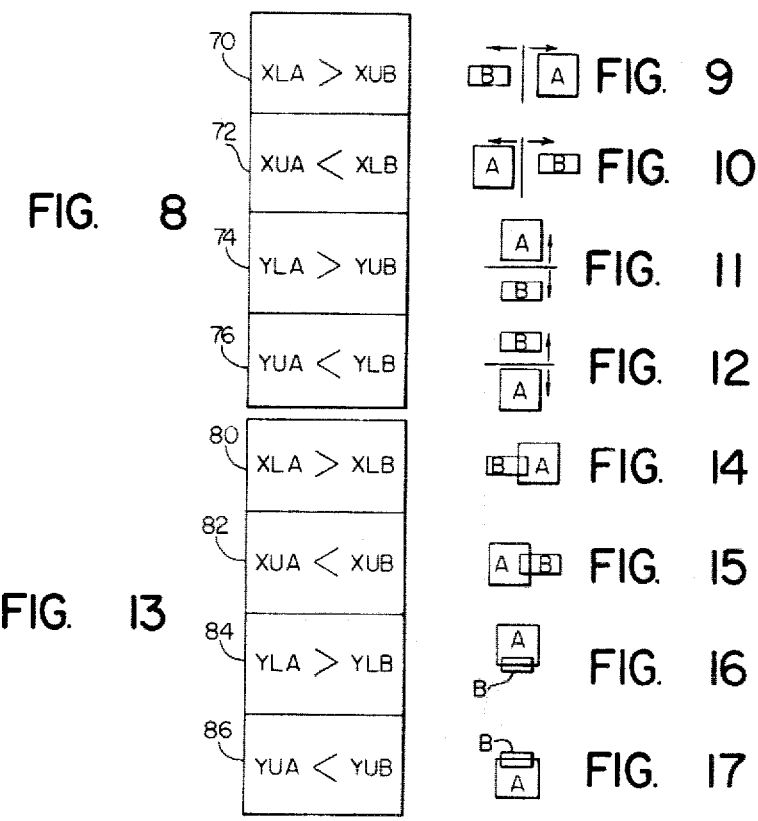

METHOD AND APPARATUS FOR CUTTING SHEET MATERIAL WITH PREPROCESSED DATA

BACKGROUND OF THE INVENTION

This invention relates to a method and apparatus for cutting sheet material and is concerned more particularly with problems that arise in automated cutting machines when a plurality of pattern pieces in a closely packed array are cut from limp sheet material.

Numerically controlled cutting machines such as disclosed in U.S. Pat. No. 3,495,492, having the same assignee as the present invention, are well known in the art and are widely accepted in industry for cutting various limp sheet materials such as woven or nonwoven fabrics, vinyl and other plastics, paper, cardboard, leather and others. The machines frequently are used to cut pattern pieces of various shapes in a predefined marker. A marker is an array of pattern pieces arranged as cut in closely spaced and sometimes contacting relationship in order to minimize the total quantity of material used. In the automatically controlled cutting machine of U.S. Pat. No. 3,495,492, a reciprocating cutting blade is guided along cutting paths defined by the pattern piece peripheries by means of a numerical or other control that responds to program data defining the shapes and positioning of the pattern pieces in the marker array.

A phenomenon that exists in cutting limp sheet materials in contrast to cutting in other arts is the fact that a blade having a sharp leading knife edge severs the material as the blade advances along a cutting path but does not remove material to any significant extent. As a result the material is pushed aside by the advancing blade and generally flows around the cutting blade in pressing engagement. Because of the engagement of the blade and material, and also because limp sheet materials are pliable even in a multi-ply layup compacted by vacuum as disclosed in the referenced patent, significant forces can be developed against the blade and cause the blade to depart from the programmed line of cut regardless of the accuracy with which the blade positioning mechanism is operated.

In cutting multi-ply layups of sheet material with a cantilevered knife blade, pattern pieces cut from the upper plies of the layup may have slightly different shapes and dimensions than the same pieces in the lower plies where the disturbing forces applied to the blade by the material cause the blade to bend. Such forces and the resulting bending are attributable to a number of factors, some of which are known and others of which are unknown. However, it is known that the forces frequently arise in connection with points of tangency or close approach in a closely packed marker array. When a cutting blade passes in close proximity to an adjacent pattern piece that was cut at an earlier stage in the operation, the kerf created by the previous cut interrupts the continuity of the limp sheet material and allows the material at one side of the knife blade to yield more easily to the blade than at the opposite side. As a result the blade experiences unbalanced lateral loading. Naturally, the closer the cutting path approaches a previous cut, the greater the unbalanced loading will be on the blade and the greater the blade bending. The blade may eventually break or jump completely into the kerf of the previous cut. Inaccuracies or damage to the machine are the ultimate consequences.

Several techniques have been developed to overcome the difficulties that are associated with tangencies and points of close approach in marker arrays. U.S. Pat. Nos. 3,855,887 and 3,864,997 having the same assignee as the present invention, reveal that a reciprocated knife blade may be slowed down with reduced feet rate signals in such critical cutting areas, and yaw signals may be applied to rotate the blade out of a tangent position at the same time. Until now, however, the introduction of compensating or remedial commands such as the reduced feed rate and yaw signals was left to the experience and skill of the person who digitized the marker array and prepared the cutting program in a basically manual process.

It is, accordingly, a general object of the present invention to provide method and apparatus for automatically preprocessing data defining a marker to identify tangencies, points of close approach and other critical cutting conditions, and to develop compensating or remedial commands for guiding a cutting blade past such cutting conditions without sacrificing accuracy or damaging the machine due to excessive blade loading.

SUMMARY OF THE INVENTION

The present invention resides in a method and apparatus for cutting pattern pieces from sheet material in accordance with preprocessed marker data. The apparatus which is employed in carrying out the method includes an automatically controlled cutting machine having a cutting table that supports limp sheet material during the cutting operation. A cutter, including a cutting tool such as a reciprocated knife blade is guided along a programmed cutting path by means of drive motors and motor control means producing command signals in accordance with program data defined by the pattern pieces in a marker.

Prior to developing the command signals, however, the program data is operated upon in a preprocessing means connected with the control means for the machine. The preprocessing means receives and processes the data defining the pattern pieces and identifies in the marker data critical points of high cutting difficulty including points of close approach or tangencies. Once such critical points have been identified, the processing means further generates remedial motor command signals such as reduced feed rates, yaw commands, and translational commands that guide the cutting blade along a path offset slightly from a path at a pattern periphery.

As a result, the preprocessing means produces a program of cutting commands that not only define the shapes and the positioning of the pattern pieces, but also include compensating command signals for guiding the cutting blade through difficult cutting situations that would otherwise result in inaccurate cutting or damage to the cutting blade or machine. Typically, the preprocessing means would be a microprocessor that handles a large volume of data at speeds far beyond human capabilities and with more completeness and accuracy than is possible or practical during the digitizing process. A more complete analysis of a marker is made and a more precise product is produced by the automatically controlled cutting machine.

BRIEF DESCRIPTION OF THE DRAWINGS

FIG. 4 is a block diagram illustrating the functional components of the preprocessor in one embodiment.

FIG. 5 is a diagram illustrating a typical feed rate program produced by the slowdown generator.

FIG. 6 is a diagram illustrating a typical yaw program produced by the yaw generator.

FIG. 7 is a diagram showing two pattern pieces in the marker array in close proximity to one another and the technique of locating critical cutting segments by means of the window comparator.

FIG. 8 is a table illustrating the comparisons made by the window comparator to establish no overlap.

FIGS. 9–12 are window diagrams representing the geometric relationships established by the comparisons in the table of FIG. 8.

FIG. 13 is a table illustrating the comparisons made by the window comparator to locate the overlapping sides of the windows.

FIGS. 14–17 are window diagrams representing the geometric relationships established by the comparisons in the table of FIG. 13.

DESCRIPTION OF THE PREFERRED EMBODIMENTS

Figure 1:
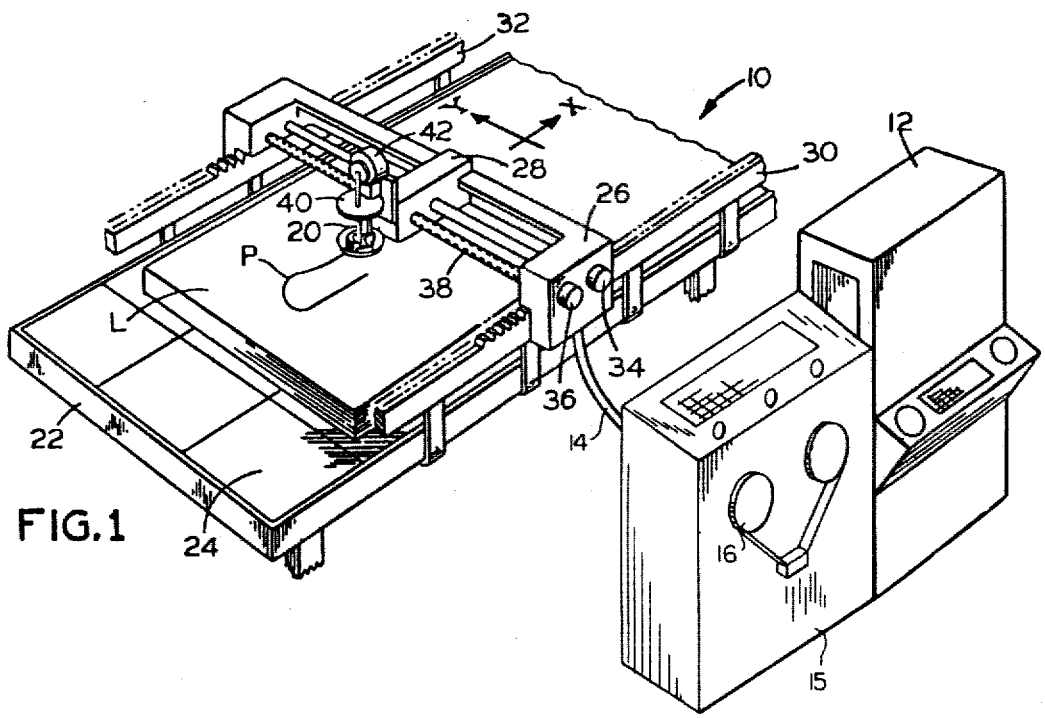
FIG. 1 is a perspective view of a cutting system having an automatically controlled cutting machine in which the present invention is employed.

FIG. 1 illustrates an automatically controlled cutting machine, generally designated 10 of the type shown and described in greater detail in U.S. Pat. No. 3,495,492 referenced above. The machine 10 is utilized to cut a multi-ply layup of a sheet material including woven and nonwoven fabrics, paper, cardboard, leather, rubber and synthetic materials. The machine is numerically controlled, and for this purpose is connected to a numerical controller 12 by means of cable 14 which transmits other signals between the controller and machine. Attached to the controller 12 is a data processor 15 which preprocesses program data utilized by the controller to produce command signals for a cutting operation. The processor 15 receives input data from a cutting program tape 16 and processes that data before it is utilized by the controller 12 to command the cutting machine. As described in greater detail below, the preprocessor analyzes the cutting data to identify critical segments of cutting paths that could lead to cutting difficulties due to the closely packed arrangement of the pattern pieces in a marker to be cut. The preprocessed data is then transmitted to the controller 12 which converts that data into machine commands for guiding a reciprocating cutting blade 20 along various cutting paths P through the sheet material. The resulting pattern pieces may be used, for example, in the manufacture of garments or upholstery products. The preprocessed data, which controls the eventual motions of the cutting blade 20, permits the close packing of pattern pieces in a marker array to be maintained because the data includes compensating commands for guiding the cutting blade through difficult cutting situations attributed to the close packing without loss of cutting accuracy.

The cutting machine 10 includes a table 22 having a penetrable bed 24 defining the support surface for the layup L during cutting. The bed 24 may be comprised of a Styrofoam material or preferably a bed of bristles which are easily penetrated by the reciprocating cutting blade 20 without damage to either while the cutting path P is traversed. The bed may also employ a vacuum system such as illustrated and described in greater detail in the above referenced U.S. Pat. No. 3,495,492 for holding the layup firmly in position.

The cutting blade 20 in a preferred embodiment is a knife blade suspended above the support surface of the table 22 by means of an X-carriage 26 and a Y-carriage 28. The X-carriage 26 translates back and forth in the illustrated X coordinate direction on a set of racks 30 and 32 which are engaged by an X-drive motor 34 energized by command signals from the controller 12. The Y-carriage 28 is mounted on the X-carriage 26 for movement relative to the X-carriage in the Y coordinate direction and is translated by the Y-drive motor 36 and a lead screw 38 connected between the motor and carriage. Like the drive motor 34, the drive motor 36 is also energized by command signals from the controller 12. Thus coordinated movements of the carriages 26 and 28 can translate the cutting blade 20 along a cutting path over any area of the table 22.

The cutting blade 20 is suspended in cantilever fashion from a platform 40 attached to the projecting end of the Y-carriage 28 for elevating the sharp, leading cutting edge of the blade into and out of cutting engagement with the layup of sheet material on the table 22. The blade 20 is reciprocated by means of a drive motor 42 also supported on the platform 40.

In order to cut pattern pieces in a marker by means of any automatically controlled machine, it is necessary to reduce the contours or peripheries of each pattern piece to a machine-readable form. For a numerically controlled machine, such as the machine 10 in FIG. 1, it is customary to reduce the contours of the pattern piece peripheries to point data by means of a coordinate digitizer. The digitizer is operated manually or in more automated systems, line followers can be employed for the same purpose. In either event, a sufficient sampling of data points lying on the pattern piece peripheries is recorded by Cartesian coordinates so that the locations of the patterns within the marker array as well as the individual contours of the pieces are well defined. From such data, the controller 12 generates the command signals that cause the X- and Y-carriages 26 and 28 in FIG. 1 to translate the cutting blade in cutting engagement with the sheet material along corresponding cutting paths.

Figure 3:
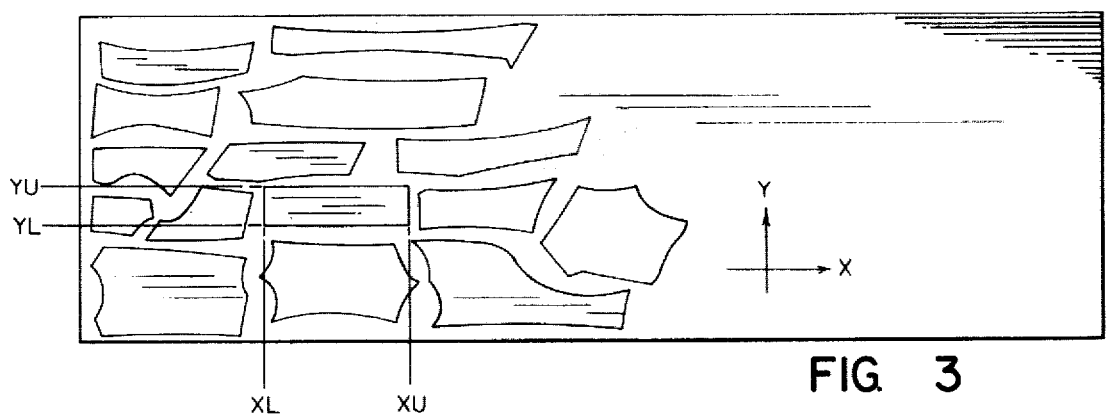
FIG. 3 is a marker of pattern pieces showing the positional relationship of the various pieces as they are cut from a layup of sheet material.

It is apparent from the marker illustrated in FIG. 3 that a plurality of pattern pieces forming a marker present difficult cutting situations due to their irregular configurations and close packing which brings the pieces into close proximity or contacting relationship with one another at random points. The markers themselves are generated in this closely packed configuration either manually or by automatic or semi-automatic marker generators such as described in the reference Patent 3,855,887.

Figure 2:
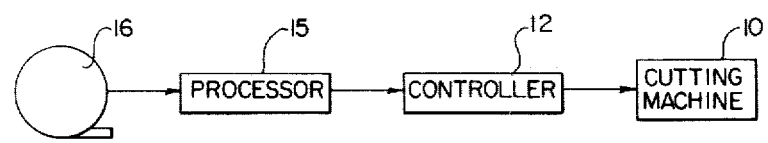
FIG. 2 is an overall diagram of the cutting system including the preprocessor of the present invention.

FIG. 2 illustrates in an overall block diagram the interrelationship of the various components which control the operation of the cutting machine 10. Basic marker data defining the positioning and contours of the pattern pieces in a marker array, such as illustrated in FIG. 3, is stored in digital form in the program tape 16 and is fed as an input to the data processor 15. After the data has been analyzed in the processor 15 for difficult cutting conditions at points of tangency or close approach, the data together with any remedial command signals is transmitted to the controller 12. The controller 12 is preferably a numerically controlled computer which converts the digitized data and remedial commands into motor command signals in accordance with conventional servo and curve algorithms. Those signals are then transmitted to the drive motors in the machine 10 to guide the cutting blade along programmed lines of cut.

FIG. 7 illustrates two pattern pieces, A and B, which are positioned in the marker in such a manner that the upper edge of the pattern piece A is located in close proximity to the lower edge of pattern piece B in the vicinity of a point 50 located on the periphery of pattern piece B. The separation of the pattern pieces at the point 50 is at a minimum and such point is therefore referred to as the point of closest approach.

It has been determined from experience that when the points of close approach are separated by certain minimum distances depending upon the type of material being cut, the depth of the layup and other factors, an automatically controlled cutting blade experiences great difficulty in following the programmed line of cut when the adjacent pattern piece has been previously cut. For example, if pattern piece A is cut prior to pattern piece B, when the cutting blade 20 advances along the periphery of pattern piece B generally parallel to the upper side of pattern piece A and comes in the vicinity of point 50, lateral forces developed by the material and applied to the blade may cause the blade to "jump" into the previous cut even though the X- and Y-carriages attempt to track the cutting blade accurately along the programmed line of cut through the point 50. Alternatively, as the blade passes point 50, lateral forces on the blade may have increased to a point which causes the blade to fracture or, if the blade has jumped into the previous cut, the reaction to the forces by the blade may cause the material to be displaced until the cutting edge cuts back into the material and continues along the remaining portions of the periphery of pattern piece B. The obvious results are that pattern piece B as cut does not conform to the programmed profile for that pattern piece. Similar consequences result when the pattern pieces are actually tangent to one another.

Such cutting problems usually arise only when the cutting paths are generally parallel and the angular relationship of the adjacent cutting paths is less than a predetermined amount, for example, 30 degrees. With larger angles lateral loading applied to the blade is not as severe and there are no segments of the cutting paths which tend to approach a parallel relationship with one another.

In accordance with the present invention, the data defining the marker is analyzed by the processor 15 to identify points of tangency or close approach. More specifically, the pattern pieces are analyzed to identify critical cutting paths which have separation distances less than a preestablished minimum separation distance. When such cutting paths are located, the processor also generates remedial or compensating command signals to guide the blade effectively past the critical cut without the difficulties mentioned above.

FIG. 4 illustrates the components of the data processor 15 in one embodiment. Typically the processor is part of the data input equipment for the control 12 and may include software or firmware programs or have a hard wired construction. One commercially available processor suitable for the purpose is a Hewlett-Packard 21MXE series, model 2113.

As shown in FIG. 4, the digitized marker data defining the contours and locations of each of the pattern pieces in the marker is transmitted from the program tape 16 into a marker memory 56 at the input of the processor. The point data defining each pattern piece is loaded sequentially into the memory in the order in which the pattern pieces are cut from the layup, and it is preferable that the marker memory have a storage capacity sufficient to hold all of the pattern pieces in the marker or at least a sufficient number of pattern pieces to conduct an analysis for all points of tangency or close approach of the pieces in one general location of the marker.

A window comparator 58 in the processor performs a preliminary analysis of the data stored in the marker memory 56 to determine if potentially critical cutting paths may be defined by the marker data. Such preliminary analysis is performed by comparing the maximum and minimum coordinates of a given pattern piece with the maximum and minimum coordinates of all previously cut pattern pieces. Since the data defining the patterns is stored in the marker memory in the order which the pattern pieces are cut, the analysis of the coordinates according to that order is possible.

In order to more clearly understand how the window comparator 58 operates and the comparison steps performed, one of the pattern pieces illustrated in the marker of FIG. 3 has been framed in a "window" that has boundaries or limits established by the maximum and minimum coordinates along both the X and Y axes. The lower and upper limits along the X-coordinate axis are designated by the abscissas XL and XU, respectively. Correspondingly, the lower and upper limits along the Y-coordinate axis are designated by the ordinates YL and YU, respectively. These limits are located in the point data of the marker memory 56 by scanning all of the coordinate data defining a particular pattern piece under investigation and selecting the maximum and minumum values for each coordinate axis. Such scanning and selecting of the maximum or minimum value from an identified group of data is an elementary function for data processors.

Once the window of a given pattern piece is defined by the comparator 58, the window is compared with the windows of every other pattern piece cut prior to the given piece to determine if the windows overlap. If the comparator finds no overlap, then there will be no overlap of the pattern pieces and the comparator proceeds to examine the next pattern piece in the cutting sequence. If the comparator determines there is an overlap, then the comparator locates the sides of the windows which define the overlap area, and other components of the processor perform more detailed analyses on the data within the overlap area to determine if there is in fact a difficult cutting condition.

FIG. 7 illustrates the two windows associated with the pattern pieces A, B. It is readily apparent that the windows fall in overlapping relationship due to the close proximity of the pattern pieces particularly in the vicinity of point 50. The upper and lower limits of the windows for the respective pattern pieces are illustrated by dotted lines and bear suffices associated with the respective pattern pieces. It is assumed that the pattern piece B is cut in sequence after pattern piece A, and in accordance with a preferred embodiment of the invention, the window of pattern piece B has been enlarged by a proximity tolerance T. That tolerance T is selected by means of the proximity preset 66 in FIG. 4 and is added to the maximum coordinate values and subtracted from the minimum coordinate values of a pattern piece for the purpose of insuring that no two pattern pieces will escape examination if they are closer to one another than the proximity tolerance. For example, if the maximum Y coordinate of pattern piece B also happened to lie at the point of closest approach of the two pattern pieces, the windows defined at those coordinates would not overlap. Nevertheless a difficult cut could exist with the pieces in such proximity. The proximity tolerance insures that a potential cutting problem is identified if the pieces are closer together than the distance T. Typically, such a tolerance for woven fabric material would be one quarter to one third inch.

FIG. 8 illustrates the preliminary data processing steps performed within the window comparator 58 to determine if any two pattern pieces, or more specifically the windows of any two pattern pieces, are not in overlapping relationship. The first comparison step illustrated in block 70 determines if the right-hand edge of the window for pattern piece B does not overlap the left-hand edge of the window for the previously cut pattern piece A. Stated otherwise, the comparison in block 70 determines if any potential for overlap exists at the referenced sides of the windows. The diagram in FIG. 9 illustrates this comparison schematically. If XLA is larger than XUB, there can be no overlap of the windows A and B as shown in FIG. 9, and an affirmative response is output by the window comparator 58. The data processor then proceeds to compare the window of pattern piece B with another previously cut pattern piece and the process is repeated until all previously cut pattern pieces have been examined.

If the result of the comparison indicated in block 70 is negative, a potential for overlap exists and then the window comparator conducts a further comparison step indicated at block 72. The comparison performed in block 72 determines if the left-hand edge of the window for pattern piece B does not overlap the right-hand edge of the window for pattern piece A. If XUA is less than XLB, then there is no overlap of the pattern pieces as indicated in FIG. 10, and the comparator 58 then proceeds to analyze the coordinates of another previously cut pattern piece. If the comparison in block 72 is negative, then it is necessary for the comparator to perform the further comparison step illustrated in block 74. The comparison of block 74 corresponds to the diagram in FIG. 11 and determines if the upper edge of the window for pattern piece B does not overlap the lower edge of the window for pattern piece A. Again if the comparison of block 74 produces an affirmative indication, the window comparator advances to an analysis of another previously cut pattern piece, but if a negative indication is given, the comparator conducts one further comparison indicated at block 76. The comparison indicated at block 76 is illustrated in FIG. 12 and determines if the lower edge of the window for pattern piece B does not overlap the upper edge of the window for pattern piece A. If the result of the comparison at block 76 is affirmative, then no overlap exists and other previously cut patterns are examined. A negative indication at this stage of analysis indicates an overlap.

As a result of the comparisons performed at blocks 70–76, there will be at least one affirmative response if the windows of the two pattern pieces under consideration do not overlap. If no affirmative response is received from any of the comparisons, then the existence of an overlap of the windows is confirmed.

FIG. 13 illustrates a table of four additional comparisons utilized to find the side or sides of the window for pattern piece B which overlap the window of pattern piece A. An affirmative response to the comparison illustrated in block 80 indicates that the windows of pattern pieces A and B overlap at the left and right sides respectively as indicated in FIG. 14. Correspondingly, affirmative indications from the comparisons identified in blocks 82, 84, and 86 identify overlaps in the pattern piece windows as shown in FIGS. 15, 16 and 17, respectively. It should be understood that when an overlap does exist in the windows, there will normally be two affirmative responses, one relating to the two X-limits of the windows and another for the two Y-limits. The four limits associated with the affirmative responses define the overlapping region of the windows and all further analysis of the pattern piece peripheries for critical cutting segments can, therefore, be limited to data points falling within the overlap area.

It will be understood that the window comparator 58 eliminates the need for determining the separation between the peripheries of pattern pieces which do not lie closer to one another than the proximity tolerance T. In a marker with fifty or more pattern pieces, there are generally not more than four or five pattern pieces in close proximity to any given piece; therefore the window comparator eliminates a substantial number of pattern pieces from the potentially critical category requiring further analysis. Additionally, however, if there is an overlap of windows, the comparator 58 also enables further analysis of pattern piece peripheries to be restricted to the area of the overlap. Accordingly, a substantial portion of the calculating and analytical steps that are needed to locate critical segments of cutting paths for the pattern pieces is reduced by the window comparator, and the computational time and equipment capacity for the calculators 60 and 62 to perform their functions are reduced without loss of the ability to preprocess data on line, that is, in real time while the cutting machine is executing a cutting operation.

As shown in FIG. 4, the information identifying the overlap area of the windows is transmitted to both the path separation calculator 60 and the angle calculator 62. In the separation calculator 60, the separation between adjacent cutting paths within the overlap area is determined mathematically from the point data defined in the buffer memory 56. If the calculator determines that the separation between the adjacent paths at any point is less than a given value set by the operator through the separation preset 90, then the angle calculator 62 also determines the entry and exit angles between the two paths at each end of the segment that is closer to a previous cut than the separation preset value. The separation preset value is preferably the same value as the proximity preset T, but can be different. If either the entry or exit angle is less than a specified maximum set by the machine operator through the angle preset 92, for example 30°, then that segment of the cutting path along the periphery of pattern piece B is designated a critical segment.

Thus critical segments or cutting paths are those segments of a pattern piece periphery which lie closer to an adjacent previous cutting path than a predetermined dimension, and which also have an angular relationship to the previous cut less than a predetermined angle.

Figure 18:
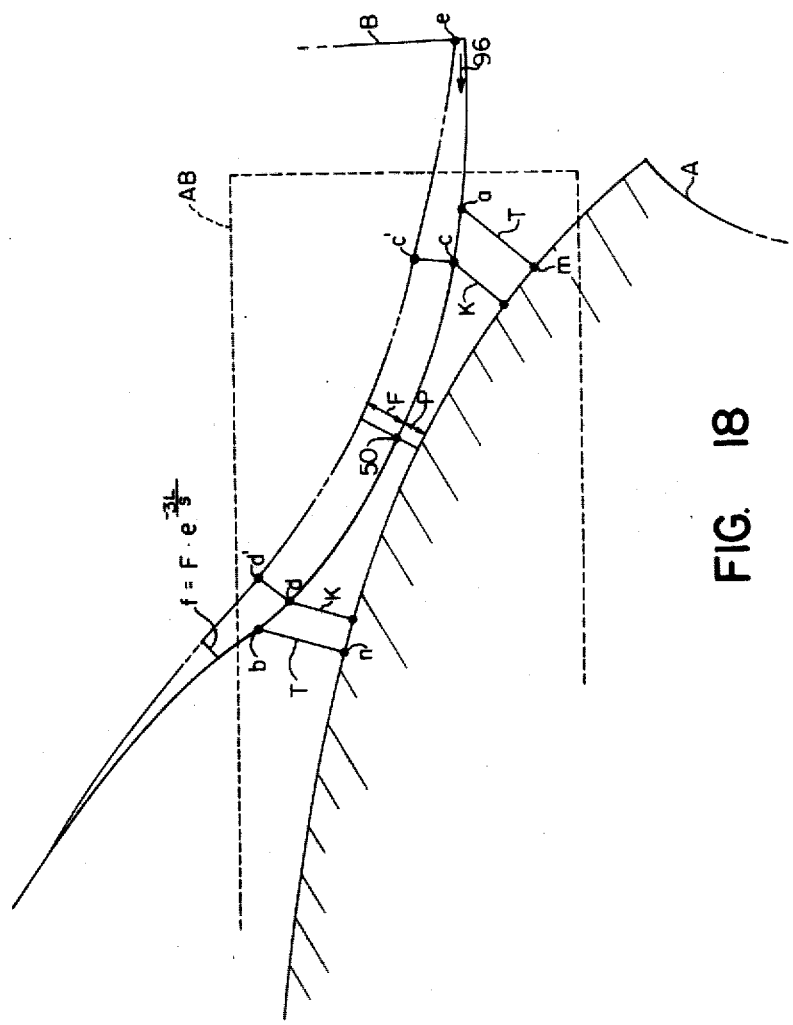
FIG. 18 is an enlarged fragmentary view of the pattern pieces in FIG. 7 at a critical cutting area.

In order to more clearly understand the calculations performed by the calculators 60 and 62, the portions of the cutting paths on pattern pieces A and B in FIG. 7 in the vicinity of the point of closest approach 50, are reproduced at enlarged scale in FIG. 18.

In FIG. 18 the overlapping portion of the windows for pattern pieces A and B is shown by a dotted line labeled AB. It is assumed in the following example that pattern piece A has already been cut and the hatching associated with the periphery of pattern piece A is provided to indicate this condition. Furthermore, it is assumed that the cutting blade traverses pattern piece B in the clockwise direction so that the blade would approach the point 50 in the direction indicated by the arrow 96.

Initially, the path separation calculator and comparator 60 scans the data points defining the periphery of pattern piece B and locates those data points that fall within the boundaries of the overlap area AB. Once the pertinent data points are located, the calculator 60 then calculates the separation between the pieces A and B within the overlap area and compares the calculated separations with the separation preset value, for example T. That portion of the cutting path within the overlap which is closer to pattern piece A than the preset T is identified as a potentially critical path segment and is illustrated in FIG. 18 as the segment ab. The separation distance T at the ends of the critical cutting path is also indicated.

The end points a and b may be inserted points but preferably are the first digitized data points lying outside the segment spaced from the pattern piece A by not more than the preset T. The entry point a is located by scanning the point data within the overlap area in the order digitized (assuming a clockwise digitizing convention is used for the patterns), and performing the separation calculation at each point. The exit point b is located in the same fashion except that the data is scanned in the reverse order.

After the end points a and b have been identified, the angle calculator and comparator 62 determines the angular relationship of the cutting path on pattern piece B at the entry point a with the adjacent path at the corresponding point m on the periphery of pattern piece A. Similarly, the calculator 62 determines the angular relationship between the cutting path on pattern piece B at point b with the corresponding point n on pattern piece A. If either of the angular relationships is less than the angle established by preset 92, then the segment ab of the cutting path on pattern piece B is designated a critical cutting segment or a critical cutting path.

As indicated above, significant difficulties occur when two paths pass in close proximity to one another and in the same general direction, that is with small angular relationships. Thus the calculators 60 and 62 examine the significant parameters associated with difficult cuts and locate the end points a,b with precision.

Because of the close proximity of the critical cutting path ab to pattern piece A, the cutting blade would have difficulty tracking the programmed line of cut unless some remedial commands are developed to assist the blade throught this region. A slowdown generator 100, a yaw generator 102, a stroke generator 104 and a path modifier 106 are provided in the data processor of FIG. 4 to produce one or a plurality of remedial commands for critical cutting paths. Reducing the feed rate is one means for overcoming cutting difficulties associated with closely adjacent cuts, and the slowdown generator 100 serves that function. In the embodiment of the data processor shown in FIG. 4, slowdown generator 100 receives information defining the data points a,b and introduces into the data for point a a reduced feed rate command for translating the cutting blade along the critical cut at a slower speed, and a resume speed command for point b. The point data with the slowdown and resume commands are then stored with the other point data in the buffer memory 101 in FIG. 4.

FIG. 5 illustrates a typical command signal profile produced by the generator 100. The maximum feed rate FM established by the program data input to the controller 12 is reduced proportionally at the point a to a slower rate FS and maintained at that level until the cutting blade reaches point b. The feed rate is increased proportionally to the programmed maximum rate FM as the cutting blade leaves the critical cutting area.

In a similar fashion the yaw generator 102 introduces a yaw command for rotating or orienting the cutting blade slightly out of a position tangent to the cutting path and toward the side of the cutting path opposite from the adjacent pattern piece A. Like the slowdown generator, the yaw generator 102 receives data from the separation calculator 60 identifying points a and b along the critical cutting path and introduces into the program data before storage in the buffer memory 101 a yaw signal at point a and a yaw washout signal at point b.

An exemplary yaw signal is illustrated in FIG. 6. The signal increases from a zero value at point a to a selected maximum YM which is maintained until the cutting blade reaches point b after which the signal is washed out. As a result, the cutting blade upon reaching point a of the cutting path is rotated slightly out of alignment with the path and away from pattern piece A and maintains that orientation as the blade passes through point 50 until point b is reached. Thereafter, the blade returns to the orientation established by the conventional command signals from the controller 12.

In a preferred form of the invention, the slowdown generator 100 and the yaw generator 102 are operated simultaneously since both slowdown and yaw signals work in combination to move the cutting blade past the critical cutting region without any significant loss in cutting accuracy that would otherwise accompany the close approach of adjacent cutting paths.

The stroke generator 104 is included to provide remedial command signals where the stroke control for the cutting machine is to be overridden. It is assumed that the cutting machine includes a stroke control that causes the reciprocation rate of the cutting blade to change generally in proportion to the feed rate of the blade. Under difficult cutting conditions, however, it may be desirable to increase the stroking rate above the proportional speed in order to generate more slicing action per length or travel. This technique also assists the cutting blade in difficult cutting situations. The stroke generator 104 therefore adds stroking commands to the point data stored in the buffer memory 101.

The path modifier 106 is a more complex component than the other generators of remedial command signals for the cutting machine. The modifier 106 establishes an offset cutting path which minimizes the disturbing forces that otherwise cause cutting difficulties along the critical cutting path.

Figure 20:
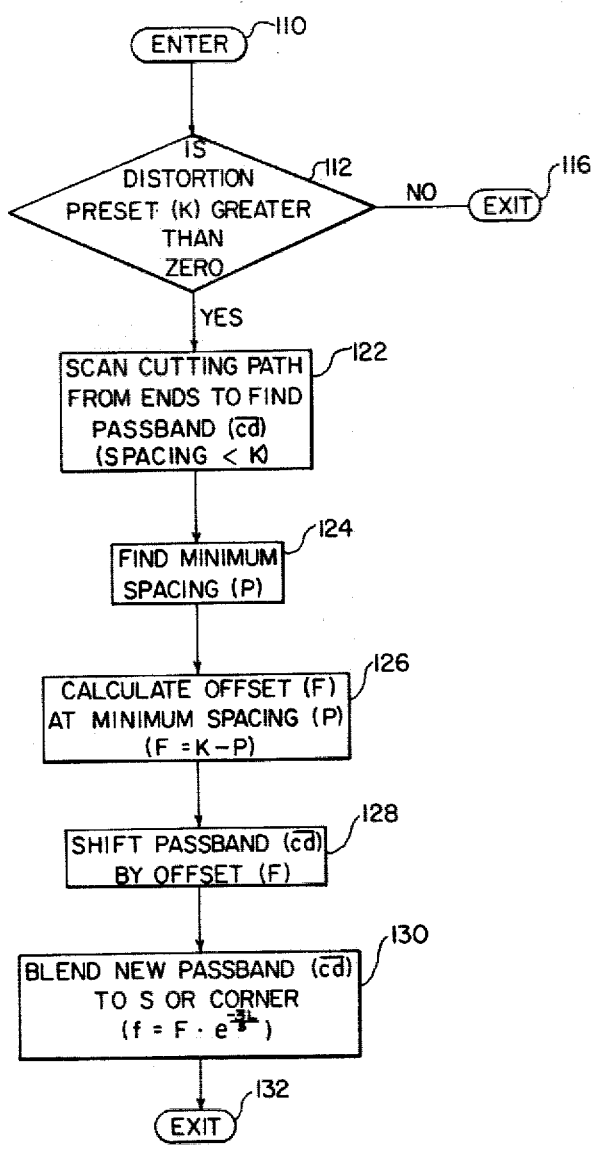
FIG. 20 is a flow diagram illustrating the logic of the path modifier in the preprocessor.

In a preferred embodiment the path modifier 106 is a portion of the processor 15 that operates in response to a software program outlined by the flow diagram illustrated in FIG. 20. The modifier 106 may be engaged for operation at the option of the machine operator either independently or in conjunction with the other generators 100, 102 and 104. The basic function of the modifier is to develop an offset cutting path that parallels the critical cutting path. Programs which calculate offsets are old in the art and have been used, for example, routinely to calculate the radially offset path of a cutting tool producing a desired profile, such as the offset path followed by the tool axis in numerically controlled milling machines or the like. While the actual calculations of an offset path are old, the application to a machine for cutting limp sheet material with a knife blade is new, particularly in association with the generation of remedial commands in difficult cutting situations.

As indicated in FIG. 20, when the path modifier is activated to produce offset cutting paths, the software program is entered at 110 and the first step performed at the block 112 is to examine the distortion preset value K as established by the preset selector 114 in FIG. 4. The distortion value K is the minimum desired spacing or separation between adjacent pattern pieces at their closest points, and additionally establishes the resulting separation between a critical cutting path and an adjacent pattern piece after the path modifier has calculated a new offset path.

The analysis performed at block 112 in the program determines if the preset has been set to some value greater than zero, which means at least some offset of the cutting paths from a tangent condition is desired. If the preset 114 has been set to zero, then no offset is necessary and the program is exited at 116.

Assuming that the distortion preset value is greater than zero, the path modifier 106 proceeds to the next step of the program indicated at block 122, and scans the critical cutting path ab for pattern piece B to find the portion of the path which lies closer to the adjacent pattern piece A than the distortion preset value K. That portion of the cutting path is designated the passband, and is illustrated in FIG. 18 between the end points c,d. The separation calculation is performed in the same manner as the calculation for locating the critical path and preferably by the same components as the separation calculator 60.

It will be observed that the proximity tolerance T is somewhat larger than the distortion distance K and thus the points a and b at which slowdown would be ordered are located before and after the points c,d respectively. It is permissible to set the proximity tolerance T and the distortion preset K equal to the same value in which case the portion of the critical cutting path affected by the change in feed rate established by the slowdown generator 100 will coincide with the passband.

In the preferred embodiment, the path modifier 106 offsets all points within the passband cd by the same amount F so that the minimum separation is equal to the preset distortion distance K. Consequently, the next step performed by the path modifier is a determination of the minimum spacing P as indicated at block 124 and shown in FIG. 18. Finding the minimum spacing is a relatively simple process at this stage of the operation since the path modifier already has determined the spacing of the cutting path from the adjacent pattern piece in the step indicated at block 122. By scanning the established distances of separation, the minimum value is readily found.

In the next step indicated at block 126, the modifier 106 calculates the offset value F in accordance with the simple equation indicated in the block, and with the value of F established, the modifier thereafter shifts or relocates the passband cd as indicated at block 128 by calculating new data points which are offset from the passband by the offset F. The end points of the shifted passband c',d' are shown in FIG. 18, and a new passband is illustrated between those points by a dashed line.

Figure 19:
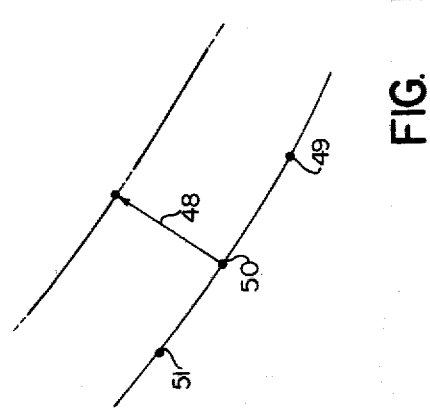
FIG. 19 is a fragmentary view of a critical path in FIG. 18 and shows the directional offset of the cutting path.

The line of offset is determined as indicated in FIG. 19. In the course of calculating the offset at block 126, the path modifier locates the bisector of the angle in the cutting path formed at the data points being moved, for example point 50. The digitized data point 49 preceding the point 50 in the course of blade travel establishes one side of the angle and the subsequent digitized point 51 establishes the other side of the angle. The resulting bisector 48 is the line of offset. The direction of offset is always away from the adjacent pattern pieces.

Since the new passband c'd' is offset from the original programmed cutting path, the path modifier as indicated at block 130 also includes a step for smoothly blending the new passband into the original cutting path. In one embodiment of the invention, the blending operation is performed by the equation indicated in block 130, which effectively washes out the offset in an exponential fashion. In the equation, f is the offset at any given point within the blending band, F is the offset calculated at block 126, s is a constant perferably equal to 30F, and L is a variable equal to the distance along the cutting path from the end of the passband, that is either point c' or d' depending upon the end of the passband which is being blended into the original cutting path. It will be noted by selecting the value of s as a function of the offset F, the rate at which the new passband is blended into the old cutting path is the same for each cutting situation, regardless of the actual value of the offset.

The blending step shown in block 130 indicates that blending extends either to a distance s or to a corner in the profile of pattern piece B, whichever is closest. The blending band c'e illustrates the blending band that terminates due to the existance of a corner in the original cutting path, whereas the blending band connected with point d' is not so terminated and continues until a substantial merger of the original and offset paths occurs. It will be noted in the latter case that blending may extend well beyond the limits of the cutting path lying within the overlap area AB even though the path modifier examines only that portion of the original cutting path lying within the overlap. When the new passband and adjoining blending bands have been calculated, the program for the path modifier is exited as indicated at 132.

Accordingly, the processor 15 of the present invention identifies points of high cutting difficulty in a marker and introduces into the data remedial command signals that change the feed rate or stroking rate of the cutting blade, introduce yaw compensation signals or offset the cutting path in critical areas. The remedial commands can be used individually or in combination with one another to produce an improved cutting operation.

While the present invention has been described in a preferred embodiment, it should be understood that numerous modifications and substitutions can be had without departing from the spirit of the invention. For example, the window comparator greatly reduces the amount of data that requires detailed examination in the processor 15; however, with high speed data processors and high storage capacity memories, such concerns may be relatively minor, and the window comparator takes on less significance. Other types of signal generators than the generators 100–104 and the path modifier 106 may be employed to produce remedial or compensating command signals for guiding the cutting blade through difficult cutting conditions. For example, means may be provided for changing the direction of cut along the cutting path in a critical area so that the cutting blade always approaches the point of tangency or close approach from opposite sides. Other remedial commands might include signals which change the gain of a lateral load sensor attached to the blade as defined in U.S. Pat. No. 4,133,235 having the same assignee as the present invention. The data processing is handled by means of a software program in a microprocessor in a preferred form of the invention; however, other hard wired or special purpose processors may also be employed. Accordingly, the present invention has been described in a preferred embodiment by way of illustration rather than limitation.

We claim:

1. Apparatus for cutting pattern pieces from sheet material in accordance with preprocessed marker data comprising:
    an automatically controlled cutting machine including a table that supports sheet material being cut, a cutter including a cutting tool, controlled motor means connected with the table and cutter for moving the cutting tool and sheet material on the table relative to one another in cutting engagement and control means connected with the motor means for producing motor command signals to guide the cutting tool along lines of cut in accordance with program data defined by the pattern pieces in the marker; and
    preprocessing means connected with the control means of the automatically controlled cutting machine for receiving and processing data defining the pattern piece in the marker prior to use in the control means of the cutting machine to identify in the marker data trouble points of high cutting difficulty including points of close approach, or tangencies and to generate remedial motor command signals, the preprocessing means including window comparator means for detecting potential trouble points of high cutting difficulty from a comparison of rectangular windows about two adjacent pattern pieces, one of the pattern pieces being cut subsequent to the other in a predetermined order established by the program data, and for further identifying critical line segments of the adjacent pattern pieces in overlapping areas of the rectangular windows.

2. Apparatus for cutting pattern pieces from sheet material as defined in claim 1 wherein:
    the control means in the automatically controlled cutting machine includes means for establishing the feed rate of the cutting tool and the sheet material relative to one another; and
    the preprocessing means includes means for generating in the processed data reduced feed rate signals for the cutting tool and material at the trouble points.

3. Apparatus for cutting pattern pieces from sheet material as defined in claim 1 wherein:
    the cutting tool in the cutting machine comprises a knife blade having a sharp leading edge which is advanced along a line of cut;
    the controlled motor means includes a motor means for orienting the knife blade relative to the line of cut at each point along the cutting path; and
    the preprocessing means includes means for generating yaw signals for orienting the knife blade at an angle to the line of cut at the trouble points.

4. Apparatus for cutting pattern pieces from sheet material as defined in claim 1 wherein the preprocessing means includes path modification means for offsetting the line of cut in the vicinity of the trouble points.

5. Apparatus for cutting pattern pieces as defined in claim 4 wherein the path modification means includes means for smoothly blending the offset portion of the cutting path in the vicinity of a trouble point with adjacent portions of the cutting path.

6. Apparatus for cutting pattern pieces from sheet material as defined in claim 1 wherein the preprocessing means includes means for calculating the separation of two adjacent lines of cut.

7. Apparatus for cutting pattern pieces from sheet material as defined in claim 6 wherein the preprocessing means further includes means for calculating the angular relationships of two cutting paths separated less than a preset amount; and means for generating remedial motor command signals when the angular relationships are less than a preset angle.

8. In a system for automatically cutting sheet material with a reciprocated cutting blade, the blade and material being moved relative to one another in cutting engagement as the blade is guided along cutting paths defined by marker data representing a plurality of patterns in a closely packed array, the improvement comprising: processing means receiving the marker data for identification of critical cutting paths in the closely packed array of patterns, the processing means including path separation calculating means for determining the separation distances of two adjacent cutting paths of patterns in the array, means for comparing the determined separation distances with a pre-established minimum separation distance to identify a critical cutting path having a segment located less than the minimum separation distance from an adjacent cutting path, and path modification means for modifying the marker data along identified critical cutting paths to offset the located segments and establish the minimum separation distance at each point along the adjacent cutting paths.

9. In a system for automatically cutting sheet material, the improvement of claim 8 wherein the processing means further includes signal generating means for producing compensating blade commands for guiding the cutting blade along critical cutting paths identified by the calculating and comparing means.

10. In a system for automatically cutting sheet material, the improvement of claim 9 wherein the signal generating means has a reduced feed rate generator for reducing the rate of advance of the cutting blade along an identified critical cutting path.

11. In a system for automatically cutting sheet material, the improvement of claim 9 wherein the signal generating means comprises a yaw signal generator for producing signals orienting the blade slightly out of a position tangent to the critical cutting path and away from the adjacent cutting path.

12. In a system for automatically cutting sheet material, the improvement of claim 8 further including in the data processing means means for calculating the angular relationships of the critical cutting path and the adjacent cutting path and means for comparing the calculated angular relationships with a minimum angle to exclude from a critical classification cutting paths having angular relationships greater than a specified amount.

13. In a system for automatically cutting sheet material with a reciprocating cutting blade the improvement of claim 8 wherein the data processing means includes a window comparator identifying patterns in the array having potentially critical cutting paths separated by less than the minimum separation distance from an adjacent pattern, the window comparator being connected in the data processing means to receive the pattern data prior to the path separation calculating means.

14. In a system for automatically cutting sheet material, the improvement as defined in claim 13 wherein: the window comparator includes means for establishing windows defined by the limits of the pattern pieces in two coordinate directions, and means for comparing the windows of one pattern piece with another for overlap.

15. In a system for cutting sheet material as defined in claim 14, the improvement wherein the window comparator and the path separation calculating means cooperate to limit calculations of the separation distances to the portions of the cutting paths lying within the window overlap.

16. A method of cutting pattern pieces from sheet material with a cutting blade and preprocessed marker data defining the pattern pieces in a closely packed array comprising:
    reducing the pattern pieces in the marker array to machine readable data defining the shapes and positioning of the patteren pieces in the array in terms of rectangular coordinates;
    preprocessing the machine readable data by comparing the data of one pattern piece with another in a data processor to determine the separation between the pieces in the array, and identifying in the data processor critical segments of a cutting path for a pattern piece which segments are located closer to an adjacent pattern piece than a predetermined amount, the step of identifying including defining rectangular windows around adjacent pattern pieces by means of the maximum and minimum coordinates along each coordinate axis, and examining the distance between the pattern pieces along those segments of the cutting paths falling within any area of a rectangular window overlapping an adjacent window;
    generating basic command signals from the machine readable data for guiding the cutting blade along cutting paths defined by the shapes and positioning of the pattern pieces in the array;
    generating remedial command signals for guiding the cutting blade past the identified critical segments; and
    cutting the pattern pieces from the sheet material by guiding the cutting blade along cutting paths defined by the shapes and positioning of the pattern pieces with the basic and remedial command signals.

17. A method of cutting pattern pieces from sheet material with a cutting blade as defined in claim 16 wherein:
    the step of generating basic command signals from the machine readable data comprises generating basic command signals controlling the feed rate of the cutting blade along a cutting path; and
    the step of generating remedial command signals comprises generating signals which reduce the feed rate established by the basic command signals along the identified critical segments of a cutting path.

18. A method of cutting pattern pieces from sheet material with a cutting blade as defined in claim 16 wherein:
    the step of generating basic command signals from the machine readable data comprises generating command signals for orienting the cutting blade tangentially of a cutting path at each point along the path; and
    the step of generating remedial command signals comprises generating yaw signals for rotating the cutting blade slightly out of the tangent position and away from an adjacent pattern piece along the identified critical segments of a cutting path.

19. A method of cutting pattern pieces from sheet material as defined in claim 16 wherein the step of generating remedial command signals comprises generating signals for guiding the cutting blade along a cutting path offset from the adjacent pattern piece by a limited amount at an identified critical segment.

20. A method of cutting pattern pieces from sheet material as defined in claim 19 wherein the step of generating signals for guiding along an offset cutting path includes generating a new cutting path offset from an identified critical segment in an old cutting path by a fixed amount and blending the new cutting path into the old cutting path at the opposite ends of the critical segment.

21. A method of cutting pattern pieces from sheet material with a cutting blade as defined in claim 16 wherein the step of comparing one pattern piece with another in the data processor to determine and identify critical segments of a cutting path comprises establishing an order in which the pattern pieces in the marker are to be cut in the array, and comparing the data of one pattern piece only with the data of pattern pieces to be cut prior to said one pattern piece to identify critical segments.

22. A method of cutting pattern pieces from sheet material as defined in claim 16 wherein the step of examining includes comparing the two maximum values of the point data in each coordinate for two pattern pieces, and comparing the two minimum values of the point data in each coordinate for the same two pieces to establish the overlapping area of the rectangular windows.

23. A method of preprocessing data defining a marker of pattern pieces to be cut from a layup of sheet material with an automatically controlled knife blade comprising the steps of:
    reading data defining the marker of pattern pieces into a data processor with the periphery of each pattern piece and the positioning of the pieces within the marker fully defined by the data;

comparing the data of each pattern piece with the data of each other pattern piece in the processor to identify critical segments of the pattern peripheries lying closer to adjacent pattern pieces than a predetermined minimum separation distance; and selectively modifying the marker data defining the pattern pieces by calculating from the data identified as a critical segment new data defining a cutting path for the blade offset from the identified critical segment and away from a closely adjacent pattern piece to establish a separation not less than the predetermined minimum.

24. A method of preprocessing data defining a marker of pattern pieces as defined in claim 23 wherein the step of comparing comprises scanning the data for each pattern piece for the limits of the peripheries in two known coordinate directions and comparing the limits of the pieces to establish the potential for critical segments having less than the minimum separation.

25. A method of preprocessing data defining a marker of pattern pieces as defined in claim 23 wherein the step of modifying the marker data additionally includes adding to the data identified as a critical segment a yaw command to orient the knife blade out of a position tangent to the cutting path and away from an adjacent pattern piece.

26. A method of preprocessing data defining a marker of pattern pieces as defined in claim 23 further including the step of adding to the modified marker data a reduced feed rate command to slow the rate at which the knife blade advances along the offset cutting path in a cutting process.

* * * * *